(12) United States Patent
Rowe (10) Patent No.: US 7,167,091 B2
(45) Date of Patent: Jan. 23, 2007

(54) VEHICLE ACTIVATED MILLIMETER-WAVE INTERROGATING

(75) Inventor: Richard L. Rowe, Saratoga, CA (US)

(73) Assignee: Safeview, Inc., Santa Clara, CA (US)

( * ) Notice: Subject to any disclaimer, the term of this patent is extended or adjusted under 35 U.S.C. 154(b) by 319 days.

(21) Appl. No.: 10/893,017

(22) Filed: Jul. 16, 2004

(65) Prior Publication Data

US 2006/0012510 A1  Jan. 19, 2006

(51) Int. Cl.
*G08B 13/18* (2006.01)

(52) U.S. Cl. ........................... 340/552; 342/179

(58) Field of Classification Search ........ 340/552–554; 382/100, 103; 367/7, 8; 342/22, 90, 179
See application file for complete search history.

(56) References Cited

U.S. PATENT DOCUMENTS

| | | | |
|---|---|---|---|
| 4,202,200 A * | 5/1980 | Ellson | 73/31.05 |
| 5,455,590 A | 10/1995 | Collins et al. | |
| 5,557,283 A | 9/1996 | Sheen et al. | |
| 5,859,609 A | 1/1999 | Sheen et al. | |
| 6,507,309 B2 | 5/2004 | McMakin et al. | |
| 6,791,487 B1 | 9/2004 | Singh et al. | |
| 7,023,339 B2 * | 4/2006 | Stomski | 340/540 |
| 2002/0140215 A1 * | 10/2002 | Breed et al. | 280/735 |
| 2003/0128150 A1 | 7/2003 | McMakin et al. | |
| 2004/0004543 A1 * | 1/2004 | Faulkner et al. | 340/531 |
| 2004/0065831 A1 * | 4/2004 | Federici et al. | 250/341.1 |
| 2004/0080315 A1 * | 4/2004 | Beevor et al. | 324/244 |
| 2004/0090359 A1 | 5/2004 | McMakin et al. | |

OTHER PUBLICATIONS

U.S. Appl. No. 10/697,965, filed Oct. 30, 2003.
U.S. Appl. No. 10/607,552, filed Jun. 26, 2003.

* cited by examiner

*Primary Examiner*—Thomas Mullen
(74) *Attorney, Agent, or Firm*—Kolisch Hartwell, P.C.

(57) ABSTRACT

An interrogating system can include an interrogating apparatus configured to transmit toward and receive from a subject in a subject position, millimeter-wave electromagnetic radiation. Such a system can also include a controller configured to operate the interrogating apparatus, and produce data representative of a characteristic of the subject from received radiation. Some embodiments of such an interrogating system may include interrogating apparatus adapted to be mounted to a passenger vehicle or at a vehicle passenger loading zone, to interrogate passengers prior to boarding the vehicle. Such embodiments may include one or more controllers positioned within the vehicle or at the loading zone.

50 Claims, 3 Drawing Sheets

Fig. 7

VEHICLE ACTIVATED MILLIMETER-WAVE INTERROGATING

BACKGROUND

Millimeter wave signals are used for radar and telecommunications. They are also capable of being used to produce data representative of a subject by directing millimeter-wave signals at the subject and detecting the reflected signal. Examples of such imaging systems have been described in U.S. Pat. Nos. 5,455,590; 5,557,283; 5,859,609; and 6,507,309; and U.S. patent application No. 10/607,552 filed Jun. 26, 2003 (issued as U.S. Pat. No. 6,872,322 on Apr. 5, 2005); U.S. patent application No. 10/697,848 filed Oct. 30, 2003; U.S. patent application No. 10/301,552 filed Nov. 21, 2002 (issued as U.S. Pat. No. 6,703,964 on Mar. 9, 2004); and U.S. patent application No. 10/697,965 filed Oct. 30, 2003, which patent references are incorporated herein by reference.

SUMMARY OF THE DISCLOSURE

An interrogating system can include an interrogating apparatus configured to transmit toward and receive from a subject in a subject position, millimeter-wave electromagnetic radiation. A subject may include a person and any object or objects carried by the person. Such a system can also include a controller configured to operate the interrogating apparatus, and produce data representative of a characteristic of the subject from received radiation, including graphical and/or textual output data.

Some embodiments of such an interrogating system may include interrogating apparatus adapted to be mounted to a passenger vehicle or at a vehicle passenger-loading zone, to interrogate passengers prior to boarding the vehicle. Such embodiments may include one or more controllers positioned within the vehicle or at the loading zone. Optionally, some embodiments may be configured to be wholly or partially operated from a location remote from the interrogating apparatus.

DETAILED DESCRIPTION OF VARIOUS EMBODIMENTS

Systems used for surveillance of persons prior to entry into a passenger vehicle may include interrogating patrons with millimeter-wave electromagnetic radiation. Vehicle-activated interrogating systems may be mounted to, or otherwise associated with, passenger vehicles, and may be configured to interrogate passengers before allowing them to board. A vehicle-mounted interrogating system may be configured to be folded between an extended position when used for interrogation and a retracted position when not in use, and may be adapted to be operated from within a passenger vehicle, such as by the vehicle operator. An interrogating station may include a vehicle-activated interrogating apparatus installed at a passenger vehicle loading zone, and may be adapted to be operated when a passenger vehicle is adjacent the loading zone. Vehicle-activated interrogating systems may include obstructing devices adapted to prevent or allow boarding of the vehicle by a passenger, and may be based at least in part on the results of interrogating the passenger.

Figure 1:
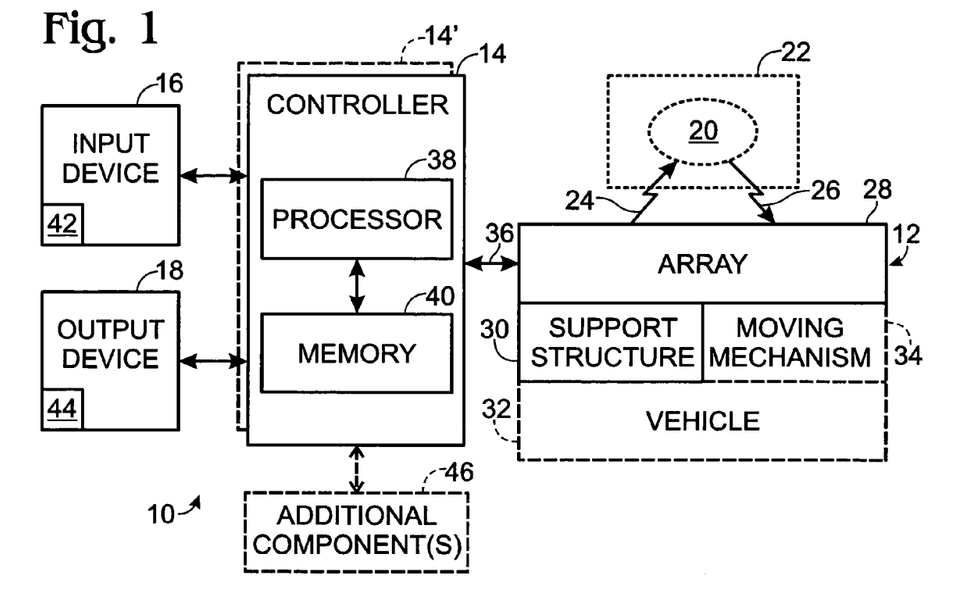
FIG. 1 is a general diagram showing an embodiment of an interrogation system.

Shown generally at 10 in FIG. 1 is an exemplary interrogation system. System 10 may include an interrogating apparatus 12, a controller 14, and in some systems, an input device 16 and/or an output device 18. The system interrogates a subject 20 in a subject position 22 in the sense that the interrogating apparatus transmits electromagnetic radiation 24 toward the subject, and in response, the subject emits or reflects electromagnetic radiation 26 that is detected by the interrogating apparatus.

Subject 20 may include all that is presented for interrogation in subject position 22, whether human, animal, or inanimate object. For example, if a person is presented for interrogation, subject 20 may include the entire person or a specific portion or portions of the person. In some applications, such as a security checkpoint at a passenger vehicle loading zone, subject 20 may include one or more passengers, who may be interrogated prior to or after boarding a vehicle as they pass through subject position 22. Optionally, subject 20 may include one or more persons, animals, objects, or a combination of these.

System 10 may be adapted to interrogate subject 20 by irradiating it with electromagnetic radiation, and detecting the reflected radiation. Electromagnetic radiation may be selected from an appropriate frequency range, such as in the range of about 100 megahertz (MHz) to 2 terahertz (THz), generally referred to herein as millimeter-wave radiation. Satisfactory imaging, or the production of images from the detected radiation, may be obtained using electromagnetic radiation in the frequency range of one gigahertz (GHz) to about 300 GHz. Radiation in the range of about 5 GHz to about 110 GHz may also be used to produce acceptable images. Some imaging systems use radiation in the range of 24 GHz to 30 GHz. Such radiation may be either at a fixed frequency or over a range or set of frequencies using several modulation types, e.g. chirp, pseudorandom frequency hop, pulsed, frequency modulated continuous wave (FMCW), or continuous wave (CW).

Certain natural and synthetic fibers may be transparent or semi-transparent to radiation of such frequencies and wavelengths, permitting the detection and/or imaging of surfaces positioned beneath such materials. For example, when the subject of interrogation is an individual having portions of the body covered by clothing or other covering materials, characteristics or other information about portions of the subject's body covered by such materials can be detected with system 10, as well as those portions that are not covered. Further, information relative to objects carried, supported by, or otherwise with a person beneath clothing can be provided with system 10 for metal and non-metal object compositions, such as those used for weapons, explosives, and the like. Thus, system 10 may be used to detect objects carried by passengers waiting to board a passenger vehicle, by determining whether data based at least in part on interrogation of a passenger contains characteristics corresponding to an object on the passenger.

Many variations of interrogating apparatus 12 are possible. For example, the interrogating apparatus may include an array 28 of one or more antenna units, each of which may further include a single antenna that transmits and receives radiation or a plurality of antennas that collectively transmit and receive radiation. Optionally, some embodiments may employ one or more antenna apparatuses as described in U.S. patent application No. 10/728,456 filed Dec. 5, 2003, entitled "Millimeter-Wave Active Imaging System" (issued as U.S. Pat. No. 6,992,616 on Jan. 31, 2006), the disclosure of which is herein incorporated by reference.

Figure 2:
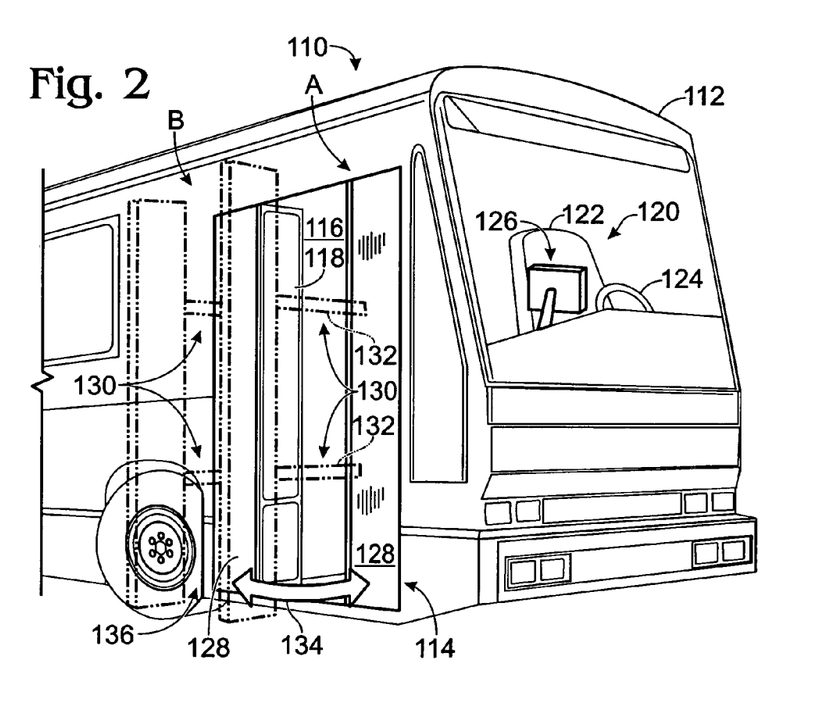
FIGS. 2 and 3 are perspective views of a portion of a passenger vehicle upon which is mounted an embodiment of a vehicle-activated interrogating system, showing vehicle-mounted interrogating apparatus that is foldable between a retracted and an extended position.
Figure 3:
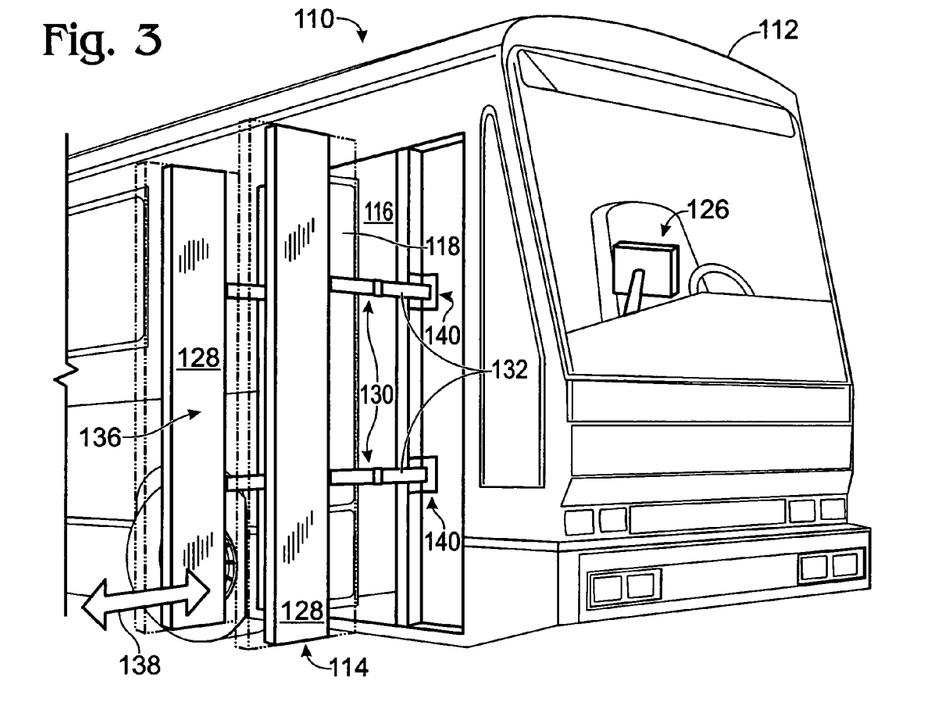

Depending on the interrogating apparatus, an interrogating system may include a support structure 30 to support interrogating apparatus 12 relative to a subject position. In some embodiments, support structure 30 may permanently or detachably mount interrogating apparatus 12 to a vehicle 32. For example, interrogating apparatus 12 may be mounted to vehicle 32 and oriented to interrogate passengers prior to boarding the vehicle. As shown in FIGS. 2 and 3 and discussed in greater detail below, the support structure in such an example may include a foldable framework operable to move the interrogating apparatus between or among a plurality of predetermined positions, such as a first position, in which the interrogating apparatus is folded out or otherwise extended from the vehicle adjacent the subject position, and a second position, in which the interrogating apparatus is folded in or otherwise retracted toward the vehicle.

Figure 7:
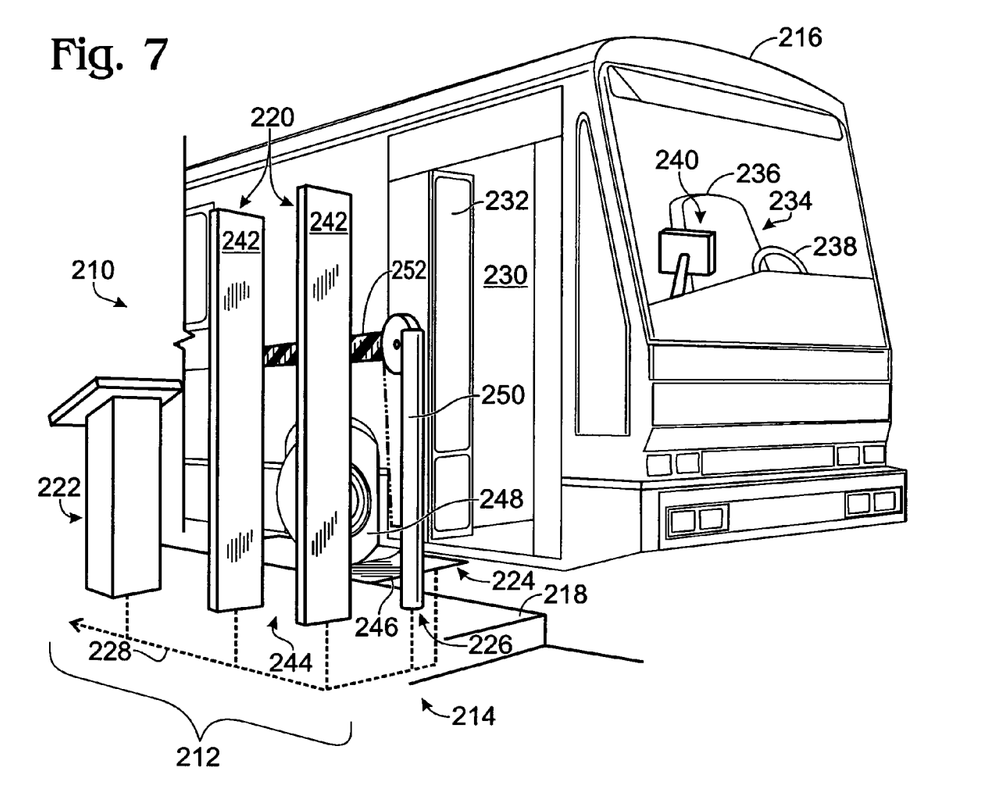
FIG. 7 is a perspective view of a portion of another embodiment of a vehicle-activated interrogating system, showing a passenger vehicle adjacent an interrogating station.

In other embodiments, support structure 30 may mount interrogating apparatus 12 at a passenger vehicle loading zone such as a bus stop or similar terminal. As shown in FIG. 7 and discussed in greater detail below, the support structure in such an example may include one or more housings and/or fittings adapted to mount interrogating apparatus 12 adjacent a subject position at a loading zone and orient the interrogating apparatus such that passengers may be interrogated prior to boarding a vehicle positioned near the loading zone.

A moving mechanism 34 may assist or perform movement of all or part of interrogating apparatus 12 relative to a subject in a subject position. For example, an interrogating apparatus mounted to a vehicle may be moved between a retracted position and an extended position by moving mechanism 34. Optionally, a vehicle-mounted interrogating apparatus in an extended position may be moved relative to a subject while extended from the vehicle.

For example, array 28 may include a single antenna unit, which may require that array 28 be moved along one or more linear dimensions of a subject position 22, to interrogate the entirety of a subject in the subject position. Alternatively, array 28 may include multiple adjacent antenna units arranged such that array 28 need not be moved with respect to subject position 22 to interrogate the entirety of a subject in the subject position.

The moving mechanism may thus be any appropriate mechanism that moves interrogating apparatus 12 and/or array 28, and may include one or more servo motors, stepper motors, and/or other suitable devices.

Interrogating apparatus 12 may be coupled to controller 14. As contemplated herein, the controller may be configured to operate the interrogating apparatus, and thus may include all structure and functions appropriate for generating, routing, processing, transmitting and receiving millimeter-wave signals to and from the interrogating apparatus, and thus may include one or more input and/or output devices. The controller, in this comprehensive sense, may include multiplexed switching among individual components of the interrogating apparatus, transmit and receive electronics, and mechanical, optical, electronic, and logic units. The controller thus may send to and receive from the interrogating apparatus signals 36, which may include appropriate signals such as control signals and data signals.

Controller 14 may control operation of moving mechanism 32, and coordinate the operation of interrogation apparatus 12 with movement of the interrogation apparatus. Controller 14 may include hardware, software, firmware, or a combination of these, and may be included in a computer, computer server, or other microprocessor-based system capable of performing a sequence of logic operations. In some embodiments, a controller may completely or partially include one or more input and/or output devices, such as a keyboard and a monitor. In addition, processing can be distributed with individual portions being implemented in separate system components. A controller 14 may be configured to control, either locally or remotely, one or more interrogation apparatus 12.

Optionally, an interrogating system may include one or a plurality of controllers, including a second controller 14'. Second controller 14' may be configured to perform all or some of the same functions as controller 14. Second controller 14' may be operable for inputting control information to, and/or receiving information from, controller 14. Further, one of controllers 14, 14' may be configured to operate to the exclusion of, or in combination with, the other controller or controllers.

One or more controllers 14, 14' may be positioned remotely from interrogating apparatus 12 and/or configured to operate, wholly or partially, several interconnected interrogating apparatus.

Controller 14 may include a processor 38 and a memory 40. Components such as input and output devices, processors, memories and memory devices, and other components, may be wholly or partly co-resident in interrogation apparatus 12 or be wholly or partly located remotely from the interrogation apparatus. In some embodiments, such components may be included in or with controller 14 and housed collectively in a console or similar assembly.

Controller 14 may be adapted to receive instructions or other input signals from one or more input devices 16, such as operator interface devices including keyboards, cursor controllers, touch-screen displays, and the like, and/or other processors, networks, and communication links. Input device 16 may be wholly or partly co-resident in controller 12 or be wholly or partly located remotely from the controller.

In some examples, input device 16 may include an activating system 42 configured to detect the presence of a vehicle relative to a loading zone, for example by electrical means such as a receiver, a transmitter, an LED, a photodiode, a phototransistor, a transducer, and a sensor, and/or by mechanical, optical, magnetic, capacitive, inductive, or any appropriate means. In such examples, activating system 42 may then communicate information relating to the presence of a vehicle to processor 38, via one or more of the means described above. Activating system 42 may optionally be configured to prevent the operation of controller 14 if no vehicle is detected to be present or if the vehicle is detected to be in motion.

Processor 38 may process data signals received from the interrogating apparatus and/or one or more input devices.

The processor thus may include hardware, software, firmware, or a combination of these, and may be included in a computer, computer server, or other microprocessor-based system capable of performing a sequence of logic operations. The processor may be any analog or digital computational device, or combination of devices, such as a computer(s), microprocessor(s), or other logic unit(s) adapted to control interrogating a subject and receiving data signals 36, and to generate output representative of a detected characteristic of the person interrogated. Such output may include any data, whether processed, partially processed or unprocessed, or sub-sets of the data, such as: data for a portion of a person; data that is manipulated in order to identify one or more characteristics of a person; data that is manipulated in order to present, for viewing by an operator or by another processor, information corresponding to one or more characteristics of a person; or information relating to an object on or with a person that is derived from received signals. The processor output may include graphical and/or textual information, such as one or more images or partial images of an interrogated person and/or any objects with the person.

In some embodiments, processor 38 may be coupled to memory 40 for storing data, such as one or more data sets generated by processor 38, or operating instructions, such as instructions for processing data. Memory 40 may be a single device or a combination of devices, and may be local to the processor or remote from it and accessible on a communication link or network.

A data set may be output to one or more output devices 18 coupled to processor 38, for example, a storage device, a communication link such as a network hub, another computer or server, a printer, or directly to a display device, such as a video monitor. Output device 18 may be wholly or partly co-resident in controller 12 or be wholly or partly located remotely from the controller.

In some applications, output device 18 may include an obstructing device 44 operable to obstruct the entrance of a vehicle coupled to interrogation system 10 and/or to selectively restrain movement of a person in a subject position. In such applications, obstructing device 44 may be configured to block or otherwise prevent entry to a vehicle or movement within a vehicle by a passenger in a subject position until the passenger has been interrogated and a given characteristic has been detected.

For example, if an interrogated passenger is determined not to be carrying a particular type of object, the obstructing device may unblock the vehicle entrance or passageway and allow the interrogated passenger to board the vehicle. Alternatively, obstructing device 44 may be configured to block the entrance of a vehicle in response to output from processor 38 indicating that a passenger is carrying a particular type of object. Optionally, obstructing device 44 may be adapted to be responsive to input provided by an operator of interrogating apparatus 10, for example, to operate or disable the obstructing device without regard to the interrogation of a passenger in a subject position.

Some embodiments may include one or more additional components, indicated generally at 46, such as additional interrogating apparatus, controllers, output devices, input devices, and so forth, each of which may be either located separately from, or together with, other components of interrogation system 10. Thus, one or more interrogating apparatus may be interconnected with one or more controllers, one or more output devices, one or more input devices, etc. Examples of such interrogating systems may include embodiments in which several vehicle-mounted interrogating apparatus are configured to be independently operable from a separately located controller, embodiments in which one output device is configured to present data sets based on interrogations performed by several interrogating apparatus, and so forth.

FIG. 2 shows an example of a vehicle-activated interrogating system, indicated generally at 110. Vehicle-activated interrogating system 110 is shown to include a passenger vehicle 112 upon which an interrogating apparatus 114 is mounted. Vehicle 112 is depicted as a bus, but may be any vehicle, including passenger vehicles such as trains, taxis, commercial aircraft, subways, and the like, or other passenger transport devices such as elevators, escalators, or moving walkways.

Vehicle 112 may include an entrance 116 on one side, within which may be situated a door 118, which may be foldable between open and closed configurations. Vehicle 112 may also include an operator station 120, which may further include an operator seat 122 and a steering mechanism 124. Interrogating system 110 may further include a controller, or console, 126, which may be positioned or otherwise configured to accept control input from, and/or provide output to, an operator of the vehicle in operator seat 122. Controller 126 may thus include one or more input and/or output devices as described above. Thus, interrogating system 110 may be "vehicle-activated" in the sense that the interrogating apparatus 112 may be adapted to be operable from the vehicle, to interrogate passengers prior to boarding.

Interrogating apparatus 114 is shown in FIG. 2 to include two substantially vertically disposed housings 128, and a support structure 130 to mount housings 128 to vehicle 112. Each of housings 128 may contain a portion of the interrogating apparatus, such as one or more antenna arrays.

Support structure 130 is shown in FIG. 2 to include a plurality of arms 132, which may be configured to collectively support the weight of interrogating apparatus 114. Arms 132 may further be operable to enable movement of the interrogating apparatus, as shown by arrow 134, between a retracted position, in which the interrogating apparatus is retracted against and substantially adjacent to the vehicle, and an extended position, in which the interrogating apparatus is extended from the vehicle and oriented to interrogate a subject. For example, in the extended position, housings 128 may be separated by a width corresponding to the width of entrance 116, to define a subject position 136, within which a passenger or other subject may be interrogated.

In FIG. 2, the retracted position is shown in solid lines and indicated by the letter "A," and the extended position is shown in dashed lines and indicated by the letter "B." Further, the interrogating apparatus in the extended position is shown at the same distance from the ground surface as in the retracted position. However, in some embodiments, the support structure may be adapted to raise or lower the interrogating apparatus relative to the vehicle as desired.

Support structure 130 may further be configured to selectively retain interrogating apparatus 114 in a predetermined position. For example, interrogating apparatus 114 may be retained in position "A" while the vehicle is in motion or when the interrogating apparatus is otherwise not being used, and retained in position "B" when the interrogating apparatus is in use, such as while the vehicle is positioned at a passenger vehicle loading zone or other location at which passengers may be interrogated prior to boarding the vehicle. Thus, support structure 130 may include mechanical elements such as struts, braces, hinge assemblies, biasing assemblies, retention mechanisms, and/or other appropriate structure to fold interrogating apparatus 114 between positions "A" and "B" and/or to retain interrogating apparatus 114 in a predetermined position.

Optionally, support structure 130 may be configured to enable movement of housings 128 relative to subject position 136 while interrogating apparatus 114 is retained in a predetermined position. Such movement may be helpful if, for example, the interrogating apparatus is narrower than the subject to be interrogated and/or the subject position. FIG. 3 shows vehicle-activated interrogating system 110 in an extended position. Arms 132, and/or support structure 130, may enable movement of housings 128 back and forth in a predetermined range of movement relative to vehicle 112 and subject position 136, as indicated by arrow 138.

Support structure 130 may include a powered moving mechanism (not separately shown in this view), such as a servomotor or powered hydraulics, integrated partially or completely within the support structure, the vehicle, and/or part of the vehicle wall to which the support structure is coupled. Such a moving mechanism may be configured to assist or perform movement of interrogating apparatus 114 relative to vehicle 112.

Support structure 130 and/or interrogating apparatus 114 may be configured to be selectively detachable from vehicle 112, for example, for maintenance or storage of interrogating apparatus 114. Thus, support structure 130 may include a plurality of mounting devices, or brackets 140, configured to detachably secure arms 132 to vehicle 112.

Figure 4:
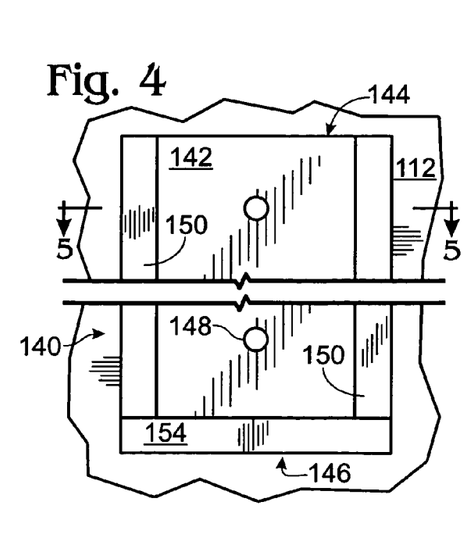
FIG. 4 is an elevation view of a bracket that may be used to mount the interrogating apparatus of FIGS. 2 and 3 to a vehicle.
Figure 5:
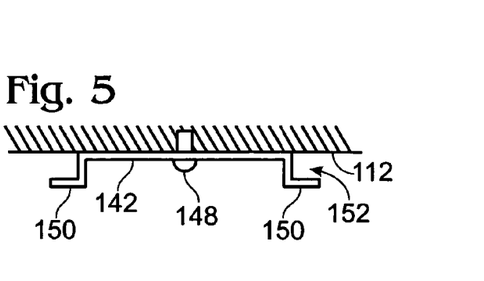
FIG. 5 is a cross section of the bracket of FIG. 4 taken along the line 5—5 in FIG. 4.

FIGS. 4 and 5 depict an example of a bracket 140. Bracket 140 is shown to include a vertically disposed, flat plate 142, with a top end 144 and a bottom end 146. The length of plate 142 may be secured to vehicle 112 by fasteners 148 such as rivets, bolts, screws, or the like. Plate 142 may terminate on opposing sides in lip portions 150, which may be spaced apart from the surface of vehicle 112 to form side channels 152. Bottom end 146 may include a base portion 154.

Figure 6:
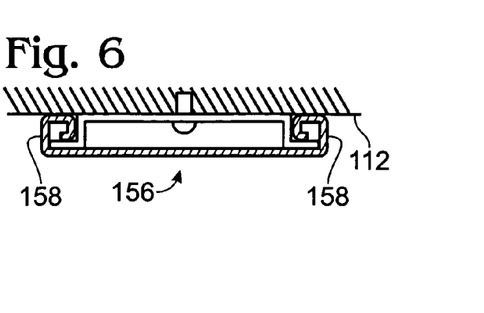
FIG. 6 is a cross section of the bracket of FIG. 4, interlocked with a corresponding mounting element.

As illustrated in FIG. 6, bracket 140 may couple with a corresponding mounting element 156 that may be secured to an arm (not shown) and/or one or more other components of the support structure. Mounting element 156 may include opposingly disposed clip members 158, which may slide downwardly within side channels 152 to form an interlock with lip portions 150. Base portion 154 may limit downward sliding of mounting element 156 relative to bracket 140, securing support structure 130 against vehicle 112.

Movement and/or operation of interrogating apparatus 114 may be controlled through the use of controller 126. Controller 126, as described above, may be configured to operate interrogating apparatus 114, detect a given characteristic of the person interrogated, and produce an output representative of the detected characteristic. Controller 126 may further include an input device such as a keyboard or touch-screen display, by Which an operator of the vehicle may provide command inputs to operate the controller, and/or an output device such as a monitor.

Door 118 may be coupled to the controller and adapted to function as an obstructing device as described above. For example, door 118 may remain closed until a passenger has been interrogated and a given characteristic has been detected, such as whether the passenger is carrying a particular type of object. In this example, door 118 may open after a passenger is determined not to be carrying such an object. Alternatively, door 118 may be configured to remain open unless the interrogated passenger is determined to be carrying a particular type of object, at which point the door may close. Optionally, door 118 may be adapted to be responsive to input provided by an operator to controller 126, for example, to open or close the door without regard to the interrogation of a passenger.

Some embodiments of a vehicle-mounted interrogating system may further include a governing device or other activating system configured to prevent operation of the interrogating apparatus while the vehicle is in motion, as a safety precaution. Optionally, a vehicle-mounted interrogating system may include an additional controller mounted away from the vehicle, for example at a passenger vehicle loading zone, adapted to perform one or more functions of the controller mounted to the vehicle. Such a vehicle-mounted interrogating system may be configured to be operated via either controller, or both controllers in combination. Further, in some embodiments, multiple vehicle-mounted interrogating apparatus may be configured to be operated, wholly or in part, from a controller mounted away from the vehicle.

FIG. 7 shows another example of a vehicle-activated interrogating system, indicated generally at 210. Vehicle-activated interrogating system 210 is shown to include an interrogating station 212 mounted adjacent a passenger vehicle loading zone 214, at which passengers may board a passenger vehicle 216. Interrogating station 212 may include several components installed to a ground surface 218, such as an interrogating apparatus 220, a first controller 222 including associated input and output devices, an obstructing device 224, and an activating system 226. Some or all of such components include and may be interconnected by a wiring system 228 disposed beneath ground surface 218, or by other appropriate means.

Vehicle 216 may include an entrance 230 on one side, within which may be situated a door 232, which may be foldable between open and closed configurations. Vehicle 216 may also include an operator station 234, which may further include an operator seat 236 and a steering mechanism 238. Vehicle 216 may further include a second controller 240, which may be positioned or otherwise configured to accept control input from, and/or provide output to, an operator of the vehicle.

Vehicle 216 is depicted as a bus, but may be any vehicle, including passenger vehicles such as trains, taxis, commercial aircraft, subways, and the like, or other passenger transport devices such as elevators, escalators, or moving walkways.

Interrogating apparatus 220 may be partially or completely disposed within a pair of vertically disposed housings 242. Housings 242 may be separated by a width corresponding to the width of entrance 230 to define a subject position 244, within which a passenger or other subject may be interrogated.

Operation of interrogating apparatus 220 may be controlled through the use of first controller 222, disposed at interrogating station 212, or second controller 240, disposed within vehicle 216, or both, in combination or separately. Either or both of controllers 222, 240, as described above, may be configured to operate interrogating apparatus 220, detect a given characteristic of the person interrogated, and produce an output representative of the detected characteristic. Either or both of controllers 222, 240 may further include an input device such as a keyboard or touch-screen display, by which an operator may provide command inputs to operate the controller, and/or an output device such as a monitor.

Thus, in interrogating system 210, interrogating apparatus 220 may be configured to be operated via either controller.

Optionally, one of controllers 222, 240 may be configured to override input commands entered through the other of the controllers.

Moreover, wiring system 228 may optionally interconnect the depicted components of interrogating system 210 with one or more additional system components such as controllers, input and output devices, and the like, located separately from interrogating station 212. For example, wiring system 228 may interconnect system components such as interrogating apparatus located at several passenger vehicle loading zones with a controller configured to operate independently each interrogating apparatus, a monitor configured to present data sets based on interrogations performed by several interrogating apparatus, and so forth.

Controllers 222, 240 may be coupled to activating system 224. As described above, activating system 224, as an input device, may be configured to detect the presence of vehicle 216 relative to loading zone 214. For example, a sensor 246 may be adapted to detect a wheel 248 of vehicle 216. However, other examples may include activating systems that may operate with specificity, such as by use of RFID tags or similar devices by which operation of a controller is enabled only when a predetermined passenger vehicle is detected relative to a loading zone.

Activating system 224 may communicate information relating to the presence of a vehicle to the controllers, and may optionally be configured to prevent the operation of the controllers if no vehicle is detected to be present or if the vehicle is detected to be in motion. Thus, interrogating system 210 may be "vehicle-activated" in the sense that the controllers may be adapted to be operable when activating system 224 detects vehicle 216 relative to loading zone 214.

Obstructing device 226 may be also coupled to one or more of the controllers and adapted to obstruct a passenger from, or allow a passenger to, board vehicle 216. In the example shown in FIG. 7, obstructing device 226 includes a base 250, hingedly connected to a swing arm 252. Swing arm 252 may be configured to swing from a horizontal "closed" position, obstructing passage to entrance 230, to a vertical "open" position, shown in dashed lines, allowing passage to entrance 230.

For example, swing arm 252 may remain closed until a passenger has been interrogated and a given characteristic has been detected, such as whether the passenger is carrying a particular type of object. In this example, swing arm 252 may open after the interrogated passenger is determined not to be carrying such an object. Alternatively, swing arm 252 may be configured to remain open unless the interrogated passenger is determined to be carrying a particular type of object, at which time the swing arm may close. Optionally, swing arm 252 may be adapted to be responsive to input provided by an operator to one of consoles 222, 240, for example, to open or close the swing arm without regard to the interrogation of a passenger.

In addition or as an alternative to obstructing device 226, door 232 may be adapted to function as an obstructing device, as described above. Further, although a swing-arm mechanism is shown, other embodiments of a vehicle-activated interrogating system may include an obstructing device adapted not only to obstruct the entrance to a passenger vehicle, but also to selectively restrain movement of a passenger. Moreover, some embodiments of a vehicle-activated interrogating system may include one controller rather than two, mounted either within a vehicle or at an interrogating station.

Using the interrogating systems described above, interrogating methods may include obstructing the entrance to a passenger vehicle, interrogating a passenger adjacent the entrance, detecting a given characteristic of the person interrogated, producing an output representative of the detected characteristic, and determining if the output includes information corresponding to an object on the passenger. In some methods, obstructing the entrance may be performed prior to the interrogating, and such methods may further include allowing the interrogated passenger to enter the vehicle if the output does not include information corresponding to an object on the person. In some methods, obstructing the entrance may be performed subsequent to the interrogating, if the output includes information corresponding to an object on the person.

Some methods may further include one or more of: producing data based at least in part on the determination of whether the output includes information corresponding to an object on the passenger; presenting the data produced for review by an operator of the system; and allowing the passenger to enter the vehicle upon review of the data by the operator of the system.

Using the vehicle-mounted interrogating systems as described above, interrogating methods may include moving the passenger vehicle to a loading zone, extending the interrogating apparatus toward a subject position, interrogating a passenger in the subject position, detecting a given characteristic of the passenger interrogated, producing an output representative of the detected characteristic, and determining if the output includes characteristics corresponding to an object on the passenger. Such methods may further include one or more of: allowing the person to enter the vehicle if the output does not include characteristics corresponding to an object on the person; and retracting the interrogating apparatus after allowing the person to enter the vehicle.

Although the present invention has been shown and described with reference to the foregoing operational principles and preferred embodiments, it will be apparent to those skilled in the art that various changes in form and detail may be made. The present disclosure is intended to embrace all such alternatives, modifications and variances that fall within the scope of the appended claims.

While the inventions defined in the following claims have been particularly shown and described with reference to the foregoing examples, those skilled in the art will understand that many variations may be made therein without departing from the spirit and scope of the inventions. Other combinations and sub-combinations of features, functions, elements, actions and/or properties may be claimed through amendment of the present claims or presentation of new claims in this or a related application. Such amended or new claims, whether they are directed to different combinations or directed to the same combinations, whether different, broader, narrower or equal in scope to the original claims, are also regarded as included within the subject matter of the present disclosure.

The foregoing embodiments are illustrative, and no single feature, element, or action is essential to all possible combinations that may be claimed in this or later applications. Where the claims recite "a" or "a first" element or the equivalent thereof, such claims should be understood to include one or more such elements, neither requiring nor excluding two or more such elements. Further, ordinal indicators, such as first, second, and third, for identified elements or actions are used to distinguish between the elements and actions, and do not indicate a required or limited number of such elements or actions, nor does it indicate a particular position or order of such elements or actions unless otherwise specifically stated.

INDUSTRIAL APPLICABILITY

The methods and apparatus described in the present disclosure are applicable to security, monitoring and other industries in which surveillance and imaging systems are utilized.

I claim:

1. An interrogating system, comprising:
   a first interrogating apparatus operable to interrogate a person in a first subject position with electromagnetic radiation in a frequency range of about 100 MHz to about 2 THz;
   a support structure adapted to be mounted to a vehicle in a manner supporting the interrogating apparatus relative to an entrance of the vehicle; and
   a first controller configured to:
     operate the interrogating apparatus;
     detect a given characteristic of the person based at least in part on the interrogation; and
     produce an output representative of the detected characteristic.

2. The interrogating system of claim 1 wherein the support structure, when mounted to a vehicle, is operable to move selectively the interrogating apparatus between a first position, in which the interrogating apparatus extends from the vehicle adjacent the subject position, and a second position, in which the interrogating apparatus is retracted toward the vehicle.

3. The interrogating system of claim 2 wherein the controller is further configured to operate the support structure.

4. The interrogating system of claim 2 where the vehicle has an entrance with sides and a width, and wherein the support structure includes two substantially vertically disposed housings, each housing containing at least a portion of the interrogating apparatus, such that, when in the first position, the housings are adapted to be positioned on opposite sides of the entrance at a width corresponding to the width of the entrance.

5. The interrogating system of claim 1 wherein the controller is adapted to be mounted to the vehicle.

6. The interrogating system of claim 5 wherein the controller is adapted to be activated by an operator.

7. The interrogating system of claim 5, further comprising a second controller adapted to perform one or more functions of the first controller, wherein the second controller is adapted to be mounted separately from the vehicle.

8. The interrogating system of claim 7, further comprising a second interrogating apparatus operable to interrogate a person in a second subject position with electromagnetic radiation in a frequency range of about 100 MHz to about 2 THz, wherein the second interrogating apparatus is adapted to be mounted separately from the vehicle and wherein one or more of the controllers are configured to operate the second interrogating apparatus.

9. The interrogating system of claim 7, wherein the second controller is adapted to be mounted at a loading zone.

10. The interrogating system of claim 1 wherein the controller is adapted to be mounted separately from the vehicle.

11. The interrogating system of claim 10, further comprising a second interrogating apparatus operable to interrogate a person in a second subject position with electromagnetic radiation in a frequency range of about 100 MHz to about 2 THz, wherein the second interrogating apparatus is adapted to be mounted separately from the vehicle and wherein the controller is configured to operate the second interrogating apparatus.

12. The interrogating system of claim 10 wherein the controller is adapted to be mounted at a loading zone.

13. The interrogating system of claim 1, wherein the controller is further configured to determine if the output includes characteristics corresponding to an object on the person.

14. The interrogating system of claim 13, wherein the controller is further configured to produce information based at least in part on the determination.

15. The interrogating system of claim 13, further including an obstructing device responsive to the controller and adapted to obstruct the entrance if the output includes characteristics corresponding to an object on the person.

16. The interrogating system of claim 15, wherein the obstructing device is further adapted to restrain movement of a person if the output includes characteristics corresponding to an object on the person.

17. The interrogating system of claim 1, further including an output device coupled to the controller and operable to present information corresponding to the detected characteristic.

18. The interrogating system of claim 17 wherein the output device is adapted to be mounted to the vehicle.

19. The interrogating system of claim 17 wherein the output device is adapted to be mounted separately from the vehicle.

20. The interrogating system of claim 1 wherein one or more of the interrogating apparatus and the support structure are adapted to be selectively detachable from the vehicle.

21. The interrogating system of claim 1 wherein one or more of the interrogating apparatus and the controller include a governing device adapted to prevent operation of the interrogating apparatus while the vehicle is in motion.

22. A vehicle including the interrogating system of claim 1.

23. An interrogating system, comprising:
   an interrogating station adapted to be mounted at a loading zone, the interrogating station including:
     an interrogating apparatus operable to interrogate a person in a subject position with electromagnetic radiation in a frequency range of about 100 MHz to about 2 THz; and
     a controller configured to:
       operate the interrogating apparatus;
       detect a given characteristic of the person based at least in part on the interrogation; and
       produce an output representative of the the detected characteristic; and
   an activating system operably coupled to the controller and adapted to detect whether a given passenger vehicle is positioned relative to the loading zone;
   wherein the controller is operable upon detection of the passenger vehicle relative to the loading zone.

24. The interrogating system of claim 23 wherein the activating system is coupled to the controller one or more of mechanically, optically, electrically, magnetically, capacitively, and inductively.

25. The interrogating system of claim 24 wherein the activating system is coupled to the controller by one or more of a receiver, a transmitter, a mechanical device, an LED, a photodiode, a phototransistor, a transducer, and a sensor.

26. The interrogating system of claim 23 wherein the activating system is further adapted to detect motion of the passenger vehicle and to prevent operation of the controller when the vehicle is in motion.

27. The interrogating system of claim 23, wherein the controller is further configured to determine if the output includes characteristics corresponding to an object on the person.

28. The interrogating system of claim 27 further including a restraining device responsive to the controller and adapted to restrain movement of a person if the output includes characteristics corresponding to an object on the person.

29. An interrogating system, comprising:
an interrogating station adapted to be mounted adjacent a vehicle passenger loading zone, the interrogating station including:
an interrogating apparatus operable to interrogate a person in a subject position with electromagnetic radiation in a frequency range of about 100 MHz to about 2 THz; and
a first controller configured to:
operate the interrogating apparatus;
detect a given characteristic of a person in the subject position; and
produce an output representative of the detected characteristic; and a second controller adapted to be mounted to a vehicle, wherein the second controller is manually operable for transmitting control information to the first controller and receiving information relating to the detected characteristic.

30. The interrogating system of claim 29 wherein the apparatus is operable upon control information transmitted to the first controller from the second controller.

31. The interrogating system of claim 29 wherein the first controller is further configured to determine if the output includes characteristics corresponding to an object on the person.

32. The interrogating system of claim 31, wherein the first controller is further configured to produce information based at least in part on the determination.

33. The interrogating system of claim 31, further including an entrance obstructing device responsive to the first controller and adapted to obstruct an entrance of the vehicle if the output includes characteristics corresponding to an object on the person.

34. The interrogating system of claim 33, wherein the entrance obstructing device is further adapted to restrain movement of a person if the output includes characteristics corresponding to an object on the person.

35. An interrogating system, comprising:
a first vehicle having an entrance;
a first interrogating apparatus mounted to the vehicle and operable to interrogate a person in a first subject position adjacent to the entrance with electromagnetic radiation in a frequency range of about 100 MHz to about 2 THz; and
a controller mounted to the vehicle and configured to:
operate the interrogating apparatus;
detect a given characteristic of a person in the subject position; and
produce an output representative of the detected characteristic.

36. The interrogating system of claim 35, further comprising a second controller adapted to perform one or more functions of the first controller, wherein the second controller is adapted to be mounted separately from the vehicle.

37. The interrogating system of claim 36, further comprising a second interrogating apparatus operable to interrogate a person in a second subject position with electromagnetic radiation in a frequency range of about 100 MHz to about 2 THz, wherein the second interrogating apparatus is adapted to be mounted separately from the vehicle and wherein one or more of the controllers are configured to operate the second interrogating apparatus.

38. The interrogating system of claim 37, further comprising a second vehicle having an entrance, wherein the second interrogating apparatus is mounted to the second vehicle and the second subject position is adjacent to the entrance of the second vehicle.

39. A method, comprising:
obstructing an entrance to a passenger vehicle;
interrogating a person adjacent the entrance with electromagnetic radiation in a frequency range of about 100 MHz to about 2 THz;
detecting a given characteristic of the person interrogated based at least in part on the interrogation;
producing an output representative of the detected characteristic; and
determining if the output includes characteristics corresponding to an object on the person.

40. The method of claim 39, wherein obstructing the entrance to a passenger vehicle is performed prior to interrogating a person adjacent the entrance with electromagnetic radiation in a frequency range of about 100 MHz to about 2 THz.

41. The method of claim 40, further including allowing the person to enter the vehicle if the output does not include characteristics corresponding to an object on the person.

42. The method of claim 39, wherein obstructing the entrance is performed subsequent to interrogating a person adjacent the entrance with electromagnetic radiation in a frequency range of about 100 MHz to about 2 THz, if the output includes characteristics corresponding to an object on the person.

43. The method of claim 39, wherein obstructing the entrance includes restraining movement of the person.

44. The method of claim 39, further comprising producing information based at least in part on the determination.

45. The method of claim 44, further comprising presenting the information produced for review by an operator.

46. The method of claim 45, further comprising allowing the person to enter the vehicle upon review of the information by the operator.

47. The method of claim 39 further comprising allowing the person to pass through the entrance if the output does not include characteristics corresponding to an object on the person.

48. A method, comprising:
moving a passenger vehicle to a loading zone;
extending an interrogating apparatus toward a subject position;
interrogating a person in the subject position with electromagnetic radiation in a frequency range of about 100 MHz to about 2 THz;
detecting a given characteristic of the person interrogated based at least in part on the interrogation;
producing an output representative of the detected characteristic; and
determining if the output includes characteristics corresponding to an object on the person.

49. The method of claim 48, further comprising allowing the person to enter the vehicle if the output does not include characteristics corresponding to an object on the person.

50. The method of claim 49, further comprising retracting the interrogating apparatus after allowing the person to enter the vehicle.

* * * * *